United States Patent [19]

Silver

[11] Patent Number: 5,387,943
[45] Date of Patent: Feb. 7, 1995

[54] SEMIAUTOMATIC LIP SYNC RECOVERY SYSTEM

[75] Inventor: David S. Silver, Beaverton, Oreg.

[73] Assignee: Tektronix, Inc., Wilsonville, Oreg.

[21] Appl. No.: 993,566

[22] Filed: Dec. 21, 1992

[51] Int. Cl.⁶ .................................... H04N 9/475
[52] U.S. Cl. ................................ 348/512; 348/515; 348/518; 348/571
[58] Field of Search .............. 358/148, 149, 150, 151, 358/160, 21 R, 105, 93, 143, 196, 183, 181; H04N 5/04, 5/26, 7/18; 360/19.1, 36.1, 9.1; 340/706, 722, 723; 382/19; 352/12, 19, 25, 14; 348/512, 515, 516, 517, 518, 519, 571, 575, 722, 738, 699, 700, 576

[56] References Cited

U.S. PATENT DOCUMENTS

| Re. 33,535 | 2/1991 | Cooper. | |
|---|---|---|---|
| 4,218,705 | 8/1980 | Inabe et al. | 358/149 |
| 4,313,135 | 1/1982 | Cooper | 358/149 |
| 4,618,890 | 10/1986 | Kouyama et al. | 358/149 |
| 4,851,909 | 7/1989 | Nocke et al. | 358/149 |
| 5,083,201 | 1/1992 | Ohba | 358/105 |

FOREIGN PATENT DOCUMENTS

| 2651628 | 9/1989 | France | H04N 5/93 |
|---|---|---|---|
| 3040177 | 2/1991 | Japan | G06F 15/62 |
| 2243969 | 11/1991 | Japan | H04N 5/40 |

OTHER PUBLICATIONS

"Viewer Stress from Audio/Visual Sync Problems" by J. Carl Cooper, pp. 140–142, S.M.P.T.E. Journal, vol. 97, No. 2, Feb. 1988.

Primary Examiner—James J. Groody
Assistant Examiner—Michael H. Lee
Attorney, Agent, or Firm—Francis I. Gray

[57] ABSTRACT

A semiautomatic lip sync recovery system for time synchronizing the audio and video channels of a television signal uses programmable delay circuits in each channel. An area of the image represented by the video channel is defined within which motion related to sound occurs. Motion vectors are generated for the defined area, and correlated with the levels of the audio channel to determine a time difference between the video and audio channels. The time difference is then used to compute delay control signals for the programmable delay circuits so that the video and audio channels are in time synchronization.

2 Claims, 2 Drawing Sheets

SEMIAUTOMATIC LIP SYNC RECOVERY SYSTEM

BACKGROUND OF THE DISCLOSURE

The present invention relates to timing errors in television systems, and more particularly to a semiautomatic lip sync recovery system for correcting timing errors between the audio and video channels of a television signal.

In current television systems a television signal includes a video channel for the image information and an audio channel for the corresponding sound information. These channels are processed in entirely different ways. Due to the different processing timing errors occur between the video and audio channel that, if not corrected, result in the sound and image of the recombined channels, when displayed on a television receiver or monitor, being out of sync. These timing errors are most noticeable when a person in the image is speaking and the movement of the person's lips does not correspond to the sound, from which comes the term "lip sync" error.

In production and broadcast television studios video frame synchronizers such as the 110-S Video Synchronizer manufactured by Tektronix, Inc. Wilsonville, Oreg., United States of America, are used to synchronize the video channel to a master timing signal within the studio. During the course of this video processing the output from the video channel may be delayed by several video frames from the input. The audio channel usually is not processed extensively so that the output from the audio channel occurs prior to the corresponding output from the video channel. It is difficult for humans to easily determine how much video-to-audio delay or advance is present. To correct the timing error introduced by the video synchronizer between the video and audio channels, audio synchronizers, such as the 118-AS Audio Synchronizer also manufactured by Tektronix, Inc., have been developed to replace manual approximations by a human operator. However these audio synchronizers correct only the delay added by the video synchronizer. They do not correct other errors accumulated upstream of the synchronizer or those incurred by subsequent processing.

What is desired is a semiautomatic lip sync recovery system that allows a human operator to easily correct for the timing error between video and audio channels of a television signal.

SUMMARY OF THE INVENTION

Accordingly the present invention provides a semiautomatic lip sync recovery system for easily correcting timing errors between video and audio channels of a television signal. The video and audio channels to be synchronized are input to respective programmable delay circuits. The video channel also is stored in a video frame buffer. The operator, via an interface circuit, outlines the position and size of the lips of a speaking person on a video monitor. The portion of the video signal from the frame buffer corresponding to the lips as outlined by the operator is input to a motion detector to produce motion vectors. The motion vectors together with the audio channel, are input to a correlation processor for determining the delays to be programmed into the respective programmable delay circuits. The correlation processor uses an appropriate correlation algorithm to link lip motion with sound loudness, or amplitude. The correlation is performed over several video frames to produce the appropriate delays so that the outputs from the respective programmable delay circuits are in time synchronization with each other.

The objects, advantages and other novel features of the present invention are apparent from the following detailed description when read in conjunction with the appended claims and attached drawing.

DESCRIPTION OF THE PREFERRED EMBODIMENT

Figure 1:
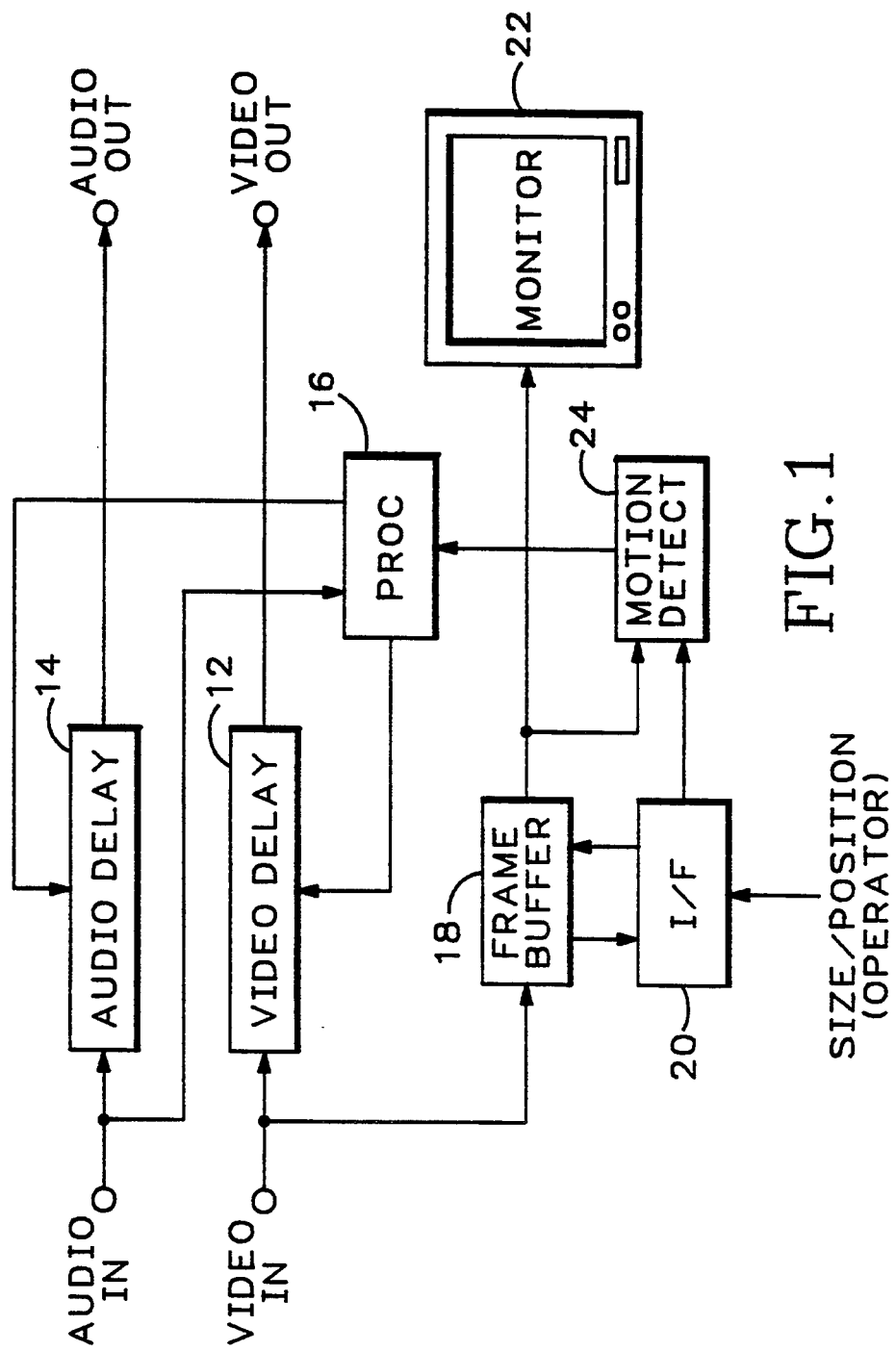
FIG. 1 is a block diagram of a semiautomatic lip sync recovery system according to the present invention.

Referring now to FIG. 1 a video channel of a television signal is input to a programmable video delay circuit 12, and an audio channel of the television signal is input to a programmable audio delay circuit 14. The amount of delay between the outputs and inputs of the programmable delay circuits is determined by respective delay control signals from a correlation processor 16. The video channel also is input to a frame buffer 18 for storage on a video frame-by-frame, or field-by-field, basis. An operator interfaces with the frame buffer 18 via an interface circuit 20. The contents of the frame buffer 18 are displayed on a video monitor 22, providing the operator with feedback in response to operator inputs. The operator inputs via the interface circuit 20, using a joystick or the like, a position and size of a lip sync outline that encompasses the lips of a speaker, as observed on the monitor 22 by a highlighted border or area. The implementation of such highlighting is a well known translucent overlay common to many video effects products.

The boundaries of the lip sync outline define a portion of the video data in the frame buffer 18 that is extracted and input to a motion detector 24. Motion vectors are computed by the motion detector from the extracted video data on a frame-by-frame, or field-by-field, basis to determine the direction and relative amount of motion between the lips. Also the size of the mouth opening is determined. Any one or more of common motion detection/estimation algorithms may be used, such as sub-pixel block matching, to generate the motion vectors. One such algorithm may be found at pages 334–350 of "Digital Pictures-Representation & Compression" by Arun N. Netravali and Barry G. Haskell of AT&T Bell Laboratories, published in 1988 by the Plenum Press of New York City, N.Y. The motion vectors output from the motion detector 24 are input to the correlation processor 16 together with the audio channel. The correlation processor 16 looks for correlation between the motion vectors and the input audio in time. For example, the correlation algorithm shown in FIG. 2 looks for motion vectors at a minimum and mouth openings at a maximum, and tries to correlate these to peaks in the audio level, i.e., a wide open mouth correlates to loud sound. This correlation is repeated over many frames of the video data. Once correlation is achieved within a specified tolerance, the delay between the audio and video channels is determined. From the determined delay value the correlation processor 16 computes a minimum delay value for the channel that is late and a sync delay value for the channel that is early, the sync delay value being the sum of the minimum and determined delay values. These delay values are applied to the respective programmable delay circuits 12, 14 as delay control signals to delay the respective channels so that the output audio and video channels are in synchronization.

Figure 2:
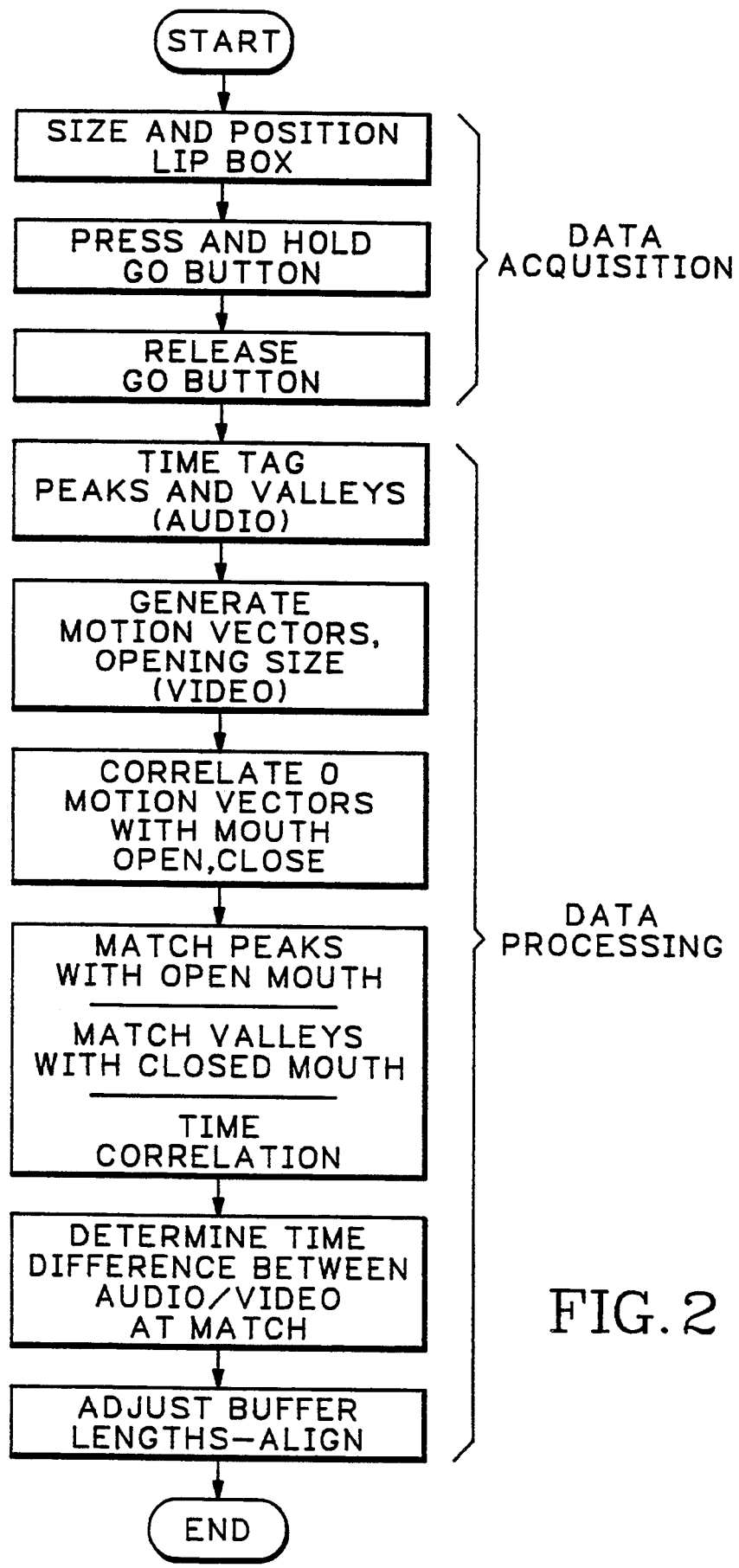
FIG. 2 is a flow chart diagram of a representative correlation algorithm according to the present invention.

In operation as shown in FIG. 2 an operator interactively via the interface circuit 20 positions and sizes the lip box about the mouth of a person in the video image by observing the video monitor 22. Once the lip box is in place, i.e., the selected lips are within the lip box, the operator presses and holds a "GO" button. When the mouth moves out of the lip box or the scene changes, the operator releases the lip box. During the period when the GO button is held, video data is stored in the frame buffer 18 and audio data is stored in a buffer in the processor 16 and pointers into the respective buffers are recorded. Once the data is acquired, the processor 16 time tags relative amplitude peaks and valleys in the audio data, as well as performing any necessary filtering, and the motion detector 24 generates motion vectors and mouth opening sizes from the video data, as well as doing any necessary filtering. The processor 16 correlates zero motion vectors with open and closed mouths. Then, using a time correlation technique of sliding the data records in time relative to each other, the processor matches peaks in the audio data with open mouths in the video data and valleys in the audio data with closed mouths in the video data. Once the processor 16 finds a match, i.e., correlation greater than a given threshold (for example 75% correlation may be sufficient), it compares the time tags of any two associated audio/video samples and subtracts them to determine a relative time difference. The processor 16 then adjusts the buffer lengths by using the pointers to realign the video with the audio by providing the appropriate delay signals to the delay circuits 12, 14.

Thus the present invention provides a semiautomatic lip sync recovery system by correlating lip movement in a video channel of a television signal with level in an audio channel of the television signal to produce delay values for the respective channels that result in audio and video synchronization at the output.

What is claimed is:

1. An apparatus for synchronizing a video channel and an audio channel of a television signal comprising:
    programmable means for selectively delaying the video and audio channels:
    means for defining an area within the image represented by the video channel that has motion corresponding to sound in the audio channel;
    means for generating motion vectors for the defined area; and
    means for producing from the motion vectors and the audio channel delay signals for the programmable delaying means so that the outputs from the programmable delaying means for the respective video and audio channels are in time synchronization.

2. A method of synchronizing an audio channel to a video channel of a television signal comprising the steps of:
    defining an area in the image represented by the video channel that has motion corresponding to sound in the audio channel;
    generating motion vectors for the defined area;
    correlating the motion vectors with the audio channel to determine a time difference between corresponding points of the video and audio channels; and
    delaying the video and audio channels according to the time difference so that the video and audio channels are in time synchronization.

* * * * *